United States Patent
Fujikake et al.

(10) Patent No.: US 10,549,664 B2
(45) Date of Patent: Feb. 4, 2020

(54) SEAT CUSHION PAD AND SEAT (71) Applicant: TACHI-S CO., LTD., Tokyo (JP)

(72) Inventors: Tsutomu Fujikake, Tokyo (JP);
Takumi Yamakawa, Tokyo (JP);
Takayuki Nosaka, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 81 days.

(21) Appl. No.: 15/524,191

(22) PCT Filed: Oct. 28, 2015

(86) PCT No.: PCT/JP2015/080438
§ 371 (c)(1),
(2) Date: Aug. 21, 2017

(87) PCT Pub. No.: WO2016/072332
PCT Pub. Date: May 12, 2016

(65) Prior Publication Data
US 2017/0368972 A1 Dec. 28, 2017

(30) Foreign Application Priority Data

Nov. 5, 2014 (JP) ................................. 2014-225268

(51) Int. Cl.
*B60N 2/66* (2006.01)
*B60N 2/90* (2018.01)

(52) U.S. Cl.
CPC .............. *B60N 2/665* (2015.04); *B60N 2/90* (2018.02); *B60N 2/914* (2018.02)

(58) Field of Classification Search
CPC .......... B60N 2/914; B60N 2/66; B60N 2/665; B60N 2/4415; B60N 2/99; A47C 7/467; A47C 7/46; A47C 7/14; A61G 5/1048
See application file for complete search history.

(56) References Cited

U.S. PATENT DOCUMENTS 3,974,827 A * 8/1976 Bodeen ................. A47C 7/467
606/237
4,589,695 A * 5/1986 Isono ..................... A47C 7/467
297/284.9
(Continued)

FOREIGN PATENT DOCUMENTS

EP  1 077 154 A2  2/2001
EP  2 607 157 A1  6/2013
(Continued)

OTHER PUBLICATIONS

International Search Report, dated Jan. 12, 2016, for corresponding international application No. PCT/JP2015/080438, 1 page.
(Continued)

Primary Examiner — Kyle J. Walraed-Sullivan
(74) Attorney, Agent, or Firm — Seed IP Law Group LLP (57) ABSTRACT

A seat cushion pad and a seat which enable reduction of a cost and improvement of use feeling are provided. The cushion pad (20) fixed in a seat frame (21) of the seat (1) includes a cushion pad body (31), and an air cell (30) which can be expanded and contracted by supplied/exhausted air. The air cell (30) is provided integrally with the cushion pad body (31) and is held by the cushion pad body (31).

10 Claims, 7 Drawing Sheets

(56) References Cited

U.S. PATENT DOCUMENTS

| | | | | |
|---|---|---|---|---|
| 4,615,563 | A * | 10/1986 | Kobayashi | A47C 7/467 297/284.6 |
| 4,728,148 | A * | 3/1988 | Saito | B60N 2/66 297/284.4 |
| 5,314,235 | A * | 5/1994 | Johnson | A47C 7/425 297/284.5 |
| 5,529,377 | A * | 6/1996 | Miller | A47C 4/54 297/284.6 |
| 6,125,851 | A * | 10/2000 | Walker | A47C 7/425 128/845 |
| 6,349,991 | B1 * | 2/2002 | Jaekel | B60N 2/4415 297/284.2 |
| 6,592,533 | B1 * | 7/2003 | Yonekawa | A47C 4/54 601/148 |
| 2010/0289302 | A1 * | 11/2010 | Cheng | B60N 2/002 297/180.12 |
| 2014/0265492 | A1 * | 9/2014 | Larsen | F16K 99/0028 297/284.1 |
| 2016/0152166 | A1 * | 6/2016 | Lorenz | B60N 2/4415 297/257 |
| 2016/0229316 | A1 * | 8/2016 | Tamura | B60N 2/2222 |

FOREIGN PATENT DOCUMENTS

| | | |
|---|---|---|
| JP | 58-53524 A | 3/1983 |
| JP | 63-232046 A | 9/1988 |
| JP | 1-46131 B2 | 10/1989 |
| JP | 2001-252146 A | 9/2001 |
| JP | 2009-172145 A | 8/2009 |
| JP | 2013-129245 A | 7/2013 |
| JP | 2014-83916 A | 5/2014 |

OTHER PUBLICATIONS

Japanese Office Action, dated Jul. 10, 2018, for Japanese Application No. 2014-225268, 10 pages. (With English Machine Translation).

Chinese Office Action, dated Jul. 27, 2018, for Chinese Application No. 201580060436.2, 12 pages. (With English Machine Translation).

Extended European Search Report, dated May 7, 2018, for European Application No. 15857351.9-1011, 7 pages.

* cited by examiner

FIG. 7

SEAT CUSHION PAD AND SEAT

TECHNICAL FIELD

The present invention relates to a seat cushion pad and a seat.

BACKGROUND ART

There is known a seat which includes an air cell, which can be expanded and contracted by supplied/exhausted air, therein, and is configured such that a hardness, a shape, or the like can be adjusted by expanding and contracting the air cell (for example, see Patent Document 1).

In the seat described in Patent Document 1, the air cell is attached in a resin plate, and is supported from a seat back surface side by the resin plate. The resin plate is attached in a seat frame through a plurality of wires laid across the seat frame. The seat front surface side of the air cell is covered with a cushion pad made of relatively soft urethane foam and the like.

RELATED ART REFERENCE

Patent Document

Patent Document 1: JP-A-2013-129245

SUMMARY OF THE INVENTION

Problems to be Solved by the Invention

In the seat described in Patent Document 1, the air cell is fixed to the seat frame through the resin plate and the plurality of wires, and plural members are necessary to fix the air cell, and thus there is a concern about high cost.

In the seat described in Patent Document 1, the seat front surface side of the air cell is covered with the cushion pad, and the surface of the cushion pad on the seat back surface side opposing the air cell is typically attached with a reinforcement material such as felt. The change of the air cell in the shape and the like by expansion and contraction is reflected in the seat front surface through the reinforcement material, and thus there is a concern that the change in the shape and the like and the resultant change in the use feeling are attenuated by the reinforcement material.

The present invention has been made in consideration of the above situation, and an object thereof is to provide a seat cushion pad and a seat which enable reduction of a cost and improvement of use feeling.

Means for Solving the Problems

A seat cushion pad, according to an, aspect of the present invention, includes: a cushion pad body; and an air cell configured to be expanded and contracted by supplied/exhausted air, wherein the air cell is provided integrally with the cushion pad body, and is held by the cushion pad body.

In a seat according to an embodiment of the present invention, the seat cushion pad is fixed in a seat frame so that the air cell is also fixed in the seat frame.

Advantages of the Invention

According to the present invention, a seat cushion pad and a seat can be provided which enable reduction of a cost and improvement of use feeling.

MODES FOR CARRYING OUT THE INVENTION

Figure 1:
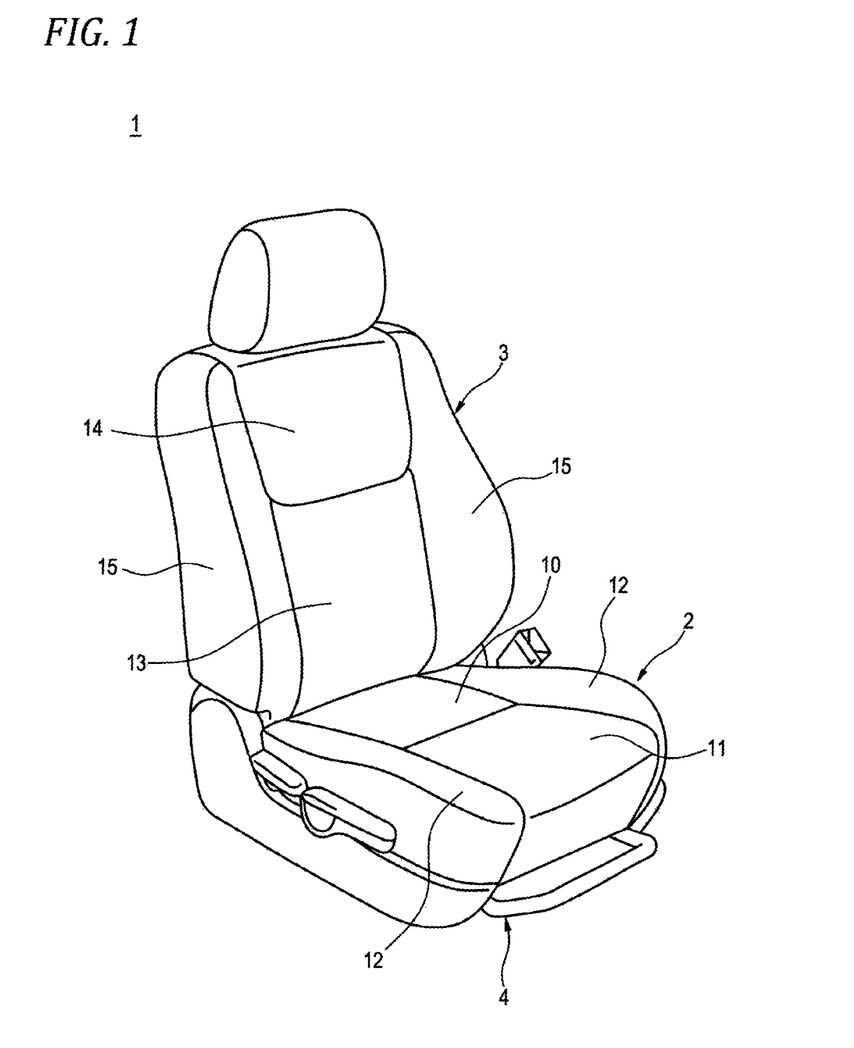
FIG. 1 is a view illustrating an appearance of an example of a seat for describing an embodiment of the present invention.
Figure 2:
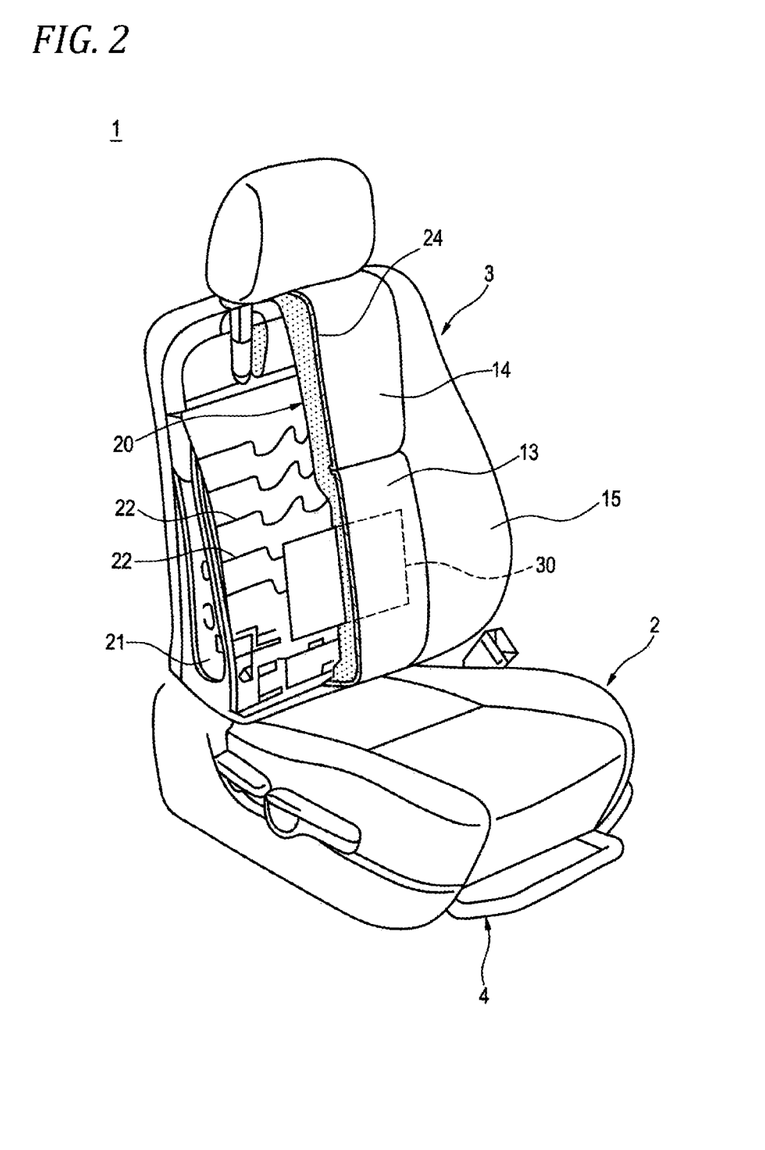
FIG. 2 is a view illustrating a schematic configuration of an inner portion of the seat of FIG. 1.

FIGS. 1 and 2 illustrate a configuration of an example of a seat for describing an embodiment of the present invention.

The seat 1 illustrated in FIGS. 1 and 2 is a seat mounted in a vehicle such as an automobile. The seat 1 includes a seat cushion 2 forming a seat surface portion, a seat back 3 forming a backrest portion, and a slide mechanism 4 movably supporting the seat cushion 2 and the seat back 3 in a front and rear direction of the vehicle.

The seat cushion 2 schematically includes a cushion part 10 supporting the buttocks of an occupant seated on the seat, a thigh support part 11 supporting a femoral region of the occupant, and a pair of side support parts 12 respectively provided on right and left sides of the seat cushion 2.

The seat back 3 schematically includes a lumber part 13 supporting a lumbar portion of the occupant seated on the seat, a middle-folded part 14 supporting a breast of the occupant, and a pair of side support parts 15 respectively provided on right and left sides of the seat back 3.

The seat back 3 includes a cushion pad 20. The cushion pad 20 is fixed in a frame-shaped seat frame 21, and is supported from a seat back surface side by a spring 22 laid across the seat frame 21. The seat frame 21, the spring 22, and the cushion pad 20 are covered with a cover 24 formed of a resin seat material such as vinyl chloride.

Although not illustrated, the seat cushion 2 is also configured similarly to the seat back 3, and includes a cushion pad. The cushion pad is fixed in a frame-shaped seat frame, and is supported from a seat bottom surface side by a spring laid across the seat frame. The seat frame, the spring, and the cushion pad are covered with a cover.

The seat 1 further includes an air cell 30 which can be expanded and contracted by supplied/exhausted air. In the illustrated example, the air cell 30 is provided in the lumber part 13 of the seat back 3. The air cell 30 is configured such that two sheet materials formed of rubber, resin, or the like are superposed, and peripheral portions thereof are sealed by a proper means such as deposition.

Figure 3:
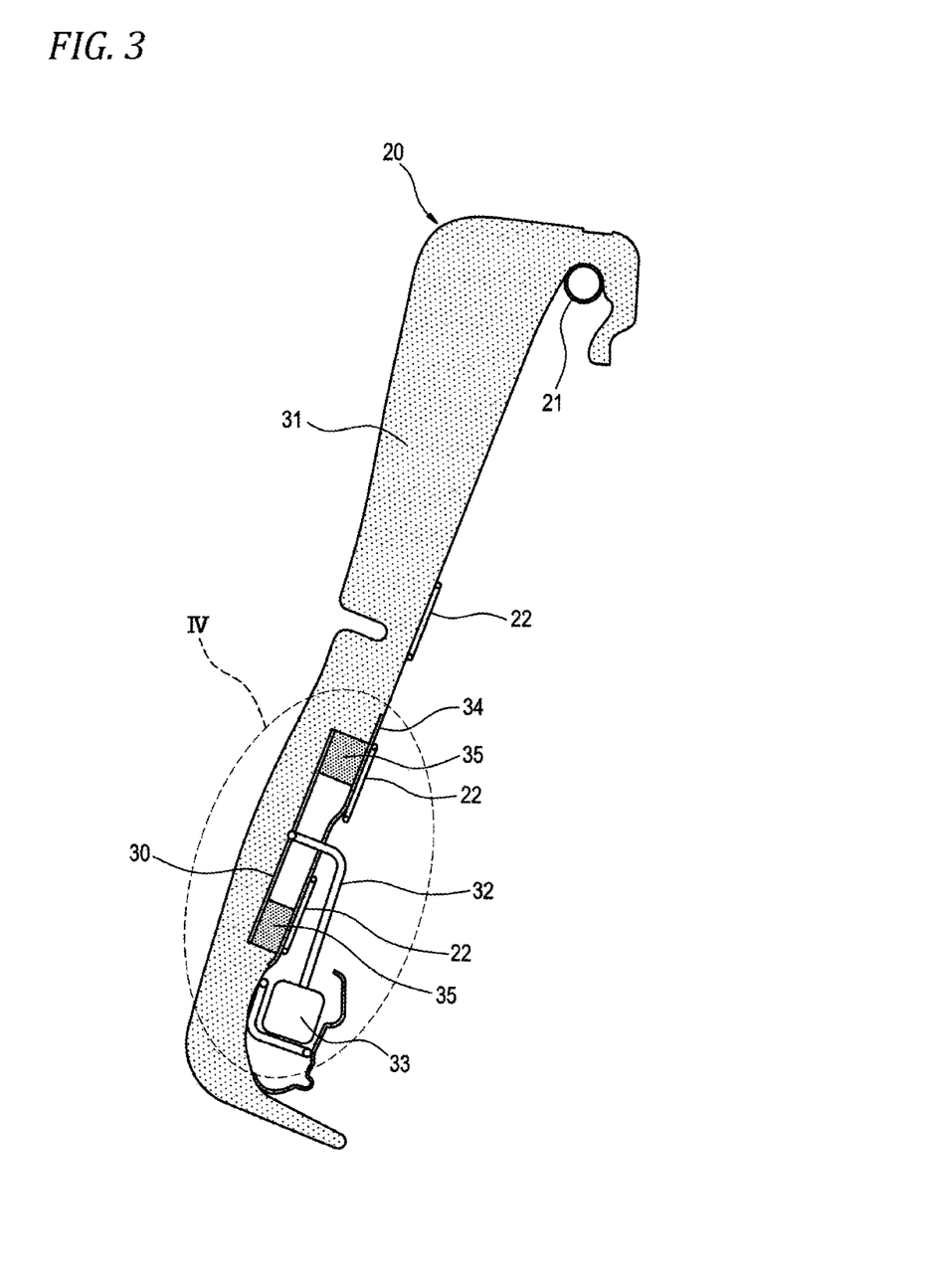
FIG. 3 is a view illustrating a configuration of a cushion pad of the seat of FIG. 1.
Figure 4:
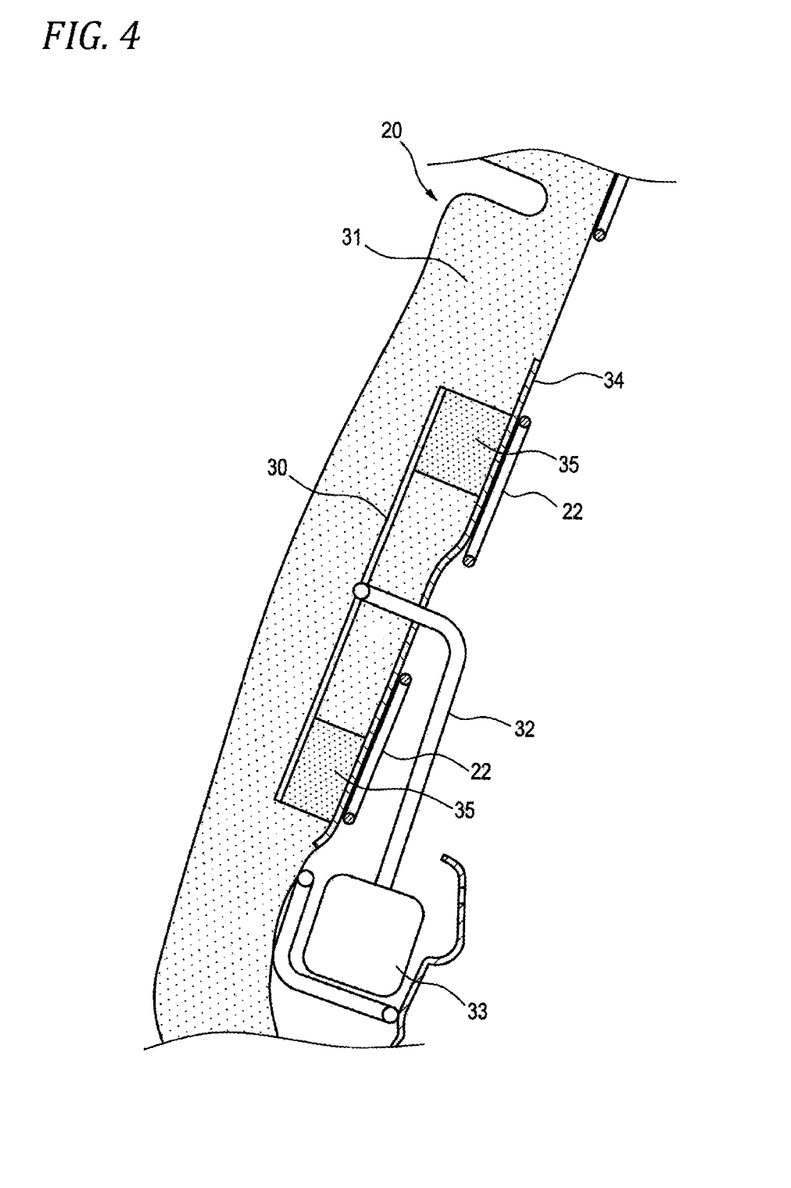
FIG. 4 is an enlarged view illustrating a portion encircled with a dotted-line circle of FIG. 3.

FIGS. 3 and 4 illustrate a configuration of the cushion pad 20 of the seat back 3.

The cushion pad 20 is fixed in the seat frame 21, and is supported from the seat back surface side by the spring 22.

The cushion pad 20 includes a cushion pad body 31 formed of a relatively soft resin foam material such as urethane foam. The air cell 30 is provided in the lower portion of the cushion pad body 31 corresponding to the lumber part 13 integrally with the cushion pad body 31, and is held by the cushion pad body 31. In the illustrated example, the air cell 30 is buried in a substantially center of the cushion pad body 31 in the front and rear direction of the seat.

The air cell 30 is connected with an air hose 32, and the air hose 32 is connected to an air adjusting part 33. The air adjusting part 33 includes an air pump and an open valve, and is operated according to an operation with respect to an operation part (not illustrated). Air is injected from the air adjusting part 33 to the air cell 30 through the air hose 32, and the air is discharged from the air cell 30. In the illustrated example, the air adjusting part 33 is provided in the seat back 3, but may be provided in the seat cushion 2.

In the illustrated example, the reinforcement material 34 is attached on the surface on the seat back surface side in the lower portion of the cushion pad body 31. The reinforcement material 34 reinforces the cushion pad body 31, and further, in this example, prevents the air cell 30 from being excessively inflated to the seat back surface side. As the reinforcement material 34, for example, a press felt is used.

As illustrated in the example, a slab 35 harder than the cushion pad body 31 may be provided between the air cell 30 and the reinforcement material 34, so that the slab 35 supports the peripheral portion of the air cell 30 from the seat back surface side. The slab 35 can be formed by impregnating the cushion pad body 31 formed of a resin foam material with resin such as urethane.

The cushion pad 20 in which the air cell 30 is buried in the substantially center of the cushion pad body 31 can be produced, for example, by foam-molding the cushion pad body 31 formed of a resin foam material integrally with the air cell 30. That is, the air cell 30 may be disposed in a predetermined position in a die for molding the cushion pad body 31, and in the state, a resin foam material may be injected into the die to make foam. Accordingly, it is possible to obtain the cushion pad 20 in which the air cell 30 is buried in the substantially center of the cushion pad body 31.

Figure 5:
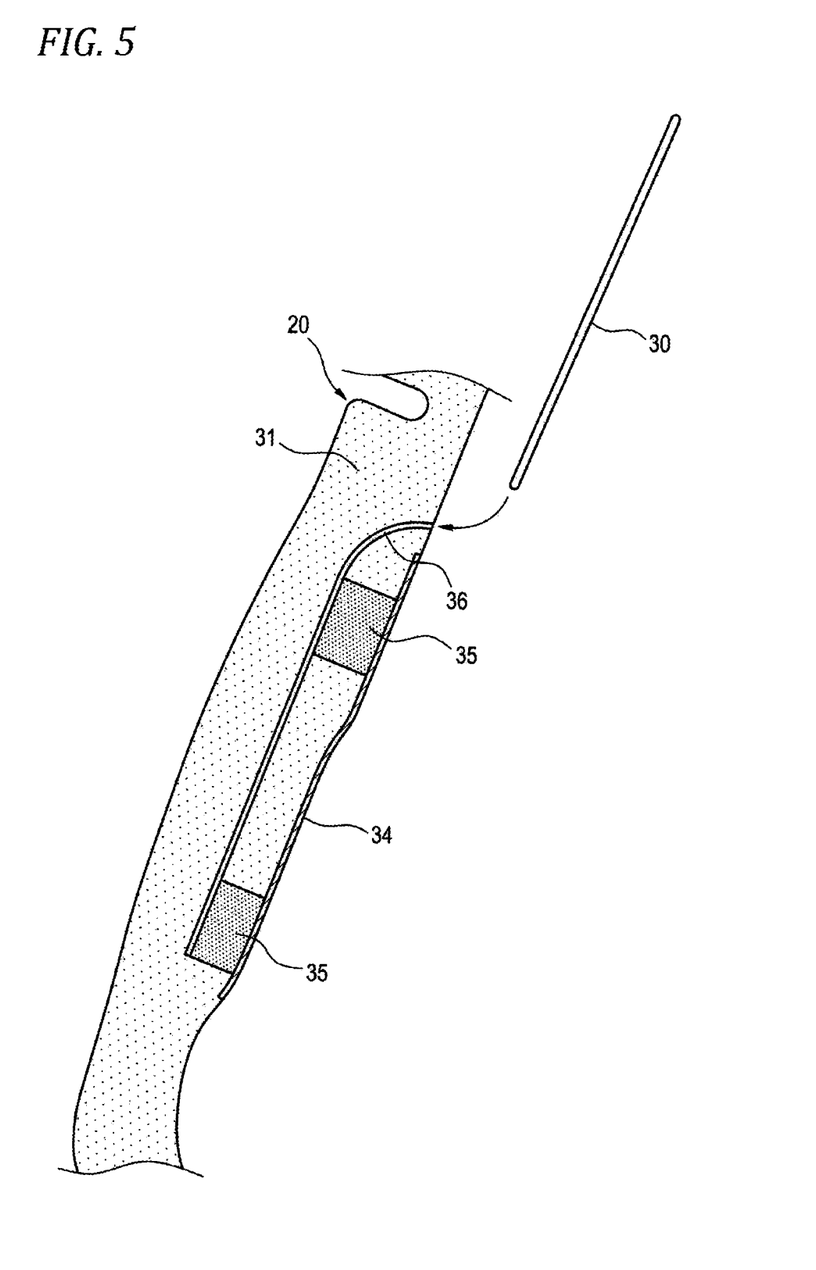
FIG. 5 is a view illustrating a configuration of a modification of the cushion pad of the seat of FIG. 1.

As illustrated in FIG. 5, a slit 36 extending inward from the surface on the seat back surface side may be provided in the cushion pad body 31, and the air cell 30 may be inserted into the slit 36. Accordingly, it is possible to obtain the cushion pad 20 in which the air cell 30 is buried in the substantially center of the cushion pad body 31.

In the cushion pad 20 of this example, the air cell 30 is provided integrally with the cushion pad body 31, and is held by the cushion pad body 31. Thus, the air cell 30 also can be fixed in the seat frame 21 by fixing the cushion pad 20 in the seat frame 21. Accordingly, it is possible to reduce the number of members and man-hours required for fixing the air cell 30, and to reduce a cost required for producing the seat 1.

In the cushion pad 20 of this example, the air cell 30 is buried in the cushion pad body 31, and is disposed in a position closer to a seat front surface contacting the occupant compared to a case where the air cell 30 is disposed to the seat back surface side of the cushion pad 20. Therefore, it is possible to effectively reflect the change of the air cell 30 in the shape and the like by expansion and contraction, and the resultant change in the use feeling in the seat front surface.

Particularly, in the cushion pad 20 of this example in which the reinforcement material 34 such as a press felt is attached to the surface of the cushion pad body 31 on the seat back surface side, the air cell 30 is disposed closer to the seat front surface side than the reinforcement material 34, so as to prevent that the change of the air cell 30 in the shape and the like by expansion and contraction is attenuated by the reinforcement material 34. Therefore, the change of the air cell 30 in the shape and the like by expansion and contraction and the resultant change in the use feeling can be reflected further effectively in the seat front surface.

Figure 6:
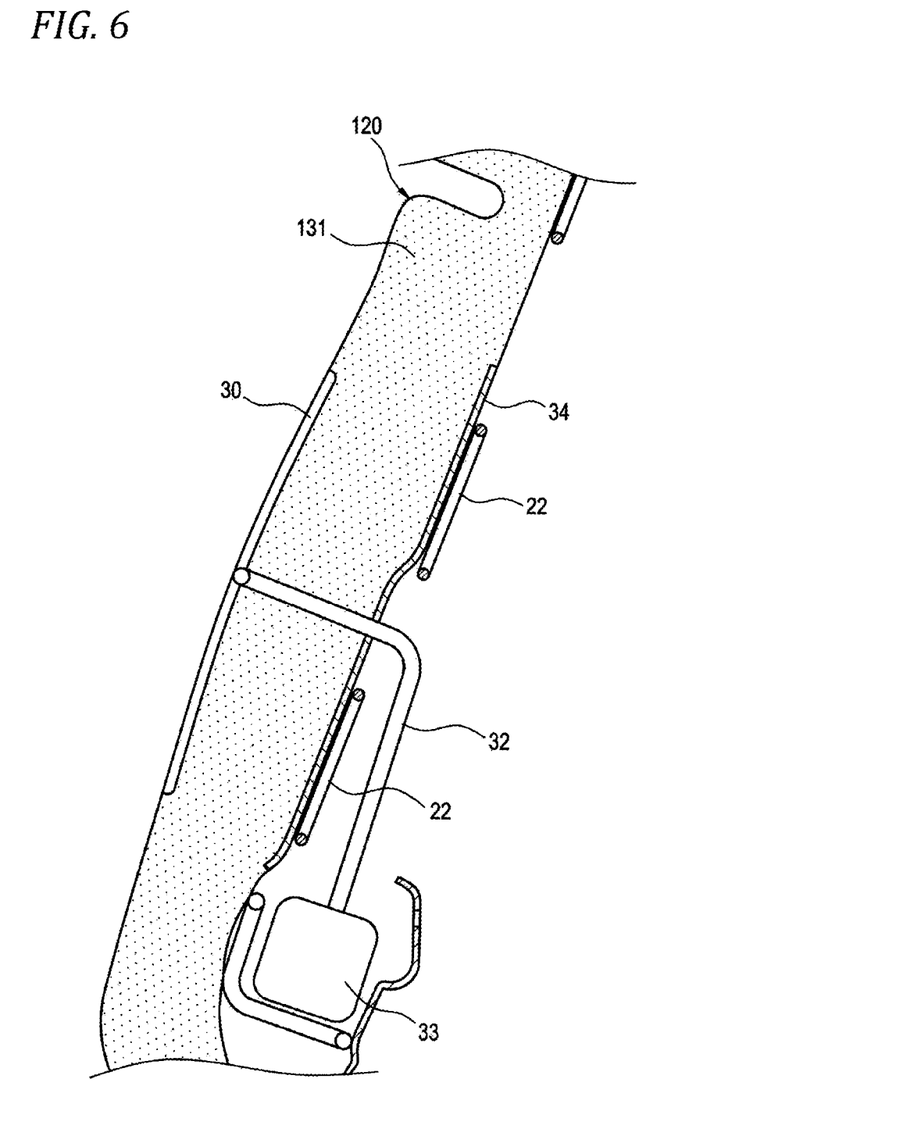
FIG. 6 is a view illustrating a configuration of another example of a cushion pad for describing the embodiment of the present invention.

FIG. 6 illustrates a configuration of another example of a cushion pad for describing the embodiment of the present invention. The same component commonly used in the above-described cushion pad 20 is denoted by the same reference numeral, and the description of the component is not given or simplified.

Similarly to the cushion pad 20 illustrated in FIG. 3, a cushion pad 120 illustrated in FIG. 6 is a cushion pad forming the seat back 3, and is fixed by the seat frame 21.

The cushion pad 120 includes a cushion pad body 131, and the air cell 30 which is provided integrally with the cushion pad body 131 and is held by the cushion pad body 131. In this example, the air cell 30 is provided on the surface of the cushion pad body 131 on the seat front surface side.

For example, the cushion pad 120 can be produced by foam-molding the cushion pad body 131 formed of a resin foam material integrally with the air cell 30. The air cell 30 may be stuck on the surface of the cushion pad body 131 on the seat front surface side by using a proper joint material such as a double-sided adhesive tape or an adhesive.

In the cushion pad 120 of this example, similarly to the cushion pad 20 illustrated in FIG. 3, it is possible to reduce the number of members and man-hours required for fixing the air cell 30, and to reduce a cost required for producing the seat. In addition, it is possible to effectively reflect the change of the air cell 30 in the shape and the like by expansion and contraction, and the resultant change in the use feeling in the seat front surface.

In the cushion pad 120 of this example, the air cell 30 is disposed on the surface of the cushion pad body 131 on the seat front surface side, and is disposed in a position closer to the seat front surface contacting the occupant than the cushion pad 20 illustrated in FIG. 3. Therefore, it is possible to directly reflect the change of the air cell 30 in the shape and the like by expansion and contraction, and the resultant change in the use feeling in the seat front surface.

Figure 7:
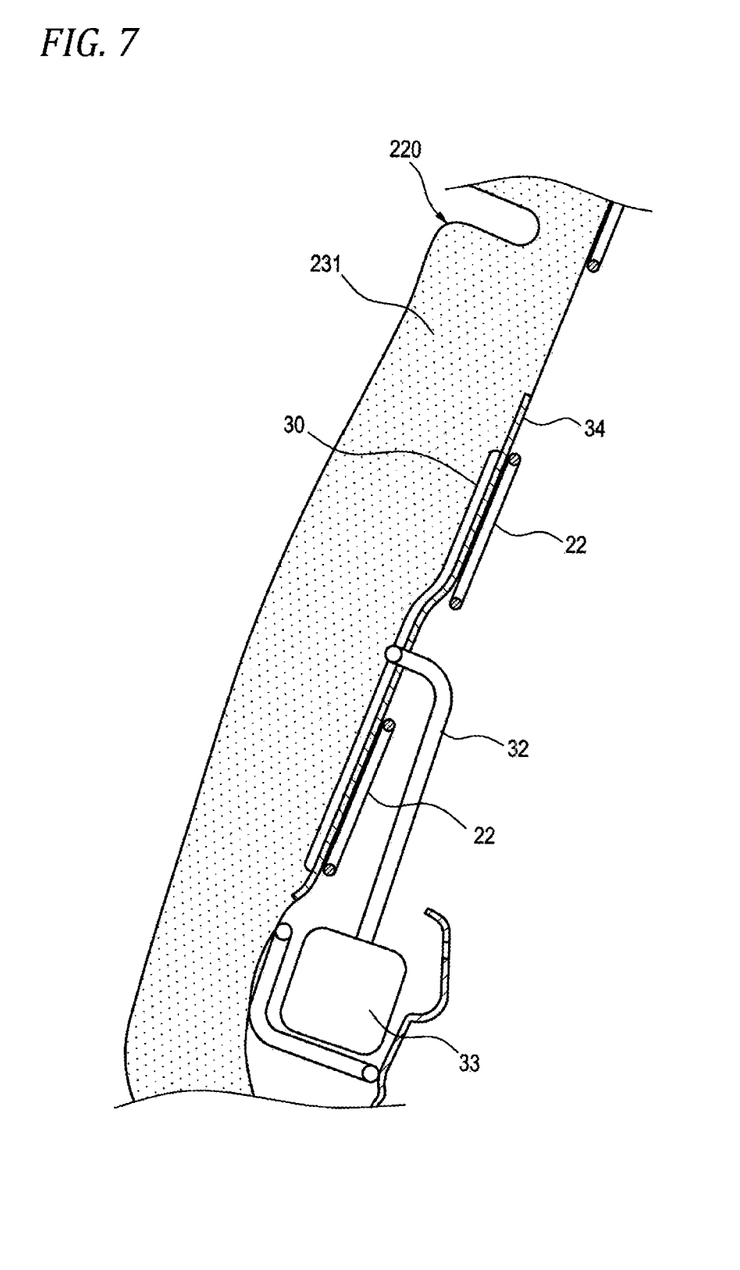
FIG. 7 is a view illustrating a configuration of further another example of a cushion pad for describing the embodiment of the present invention.

FIG. 7 illustrates a configuration of further another example of a cushion pad for describing the embodiment of the present invention. The same component commonly used in the above-described cushion pad 20 is denoted by the same reference numeral, and the description of the component is not given or simplified.

Similarly to the cushion pad 20 illustrated in FIG. 3, a cushion pad 220 illustrated in FIG. 7 is a cushion pad forming the seat back 3, and is fixed in the seat frame 21.

The cushion pad 220 includes a cushion pad body 231, and the air cell 30 which is provided integrally with the cushion pad body 231 and is held by the cushion pad body 231. In this example, the air cell 30 is provided on the surface of the cushion pad body 231 on the seat back surface side between the cushion pad body 231 and the reinforcement material 234.

For example, the cushion pad 220 can be produced by foam-molding the cushion pad body 231 formed of a resin foam material integrally with the air cell 30. The air cell 30 may be stuck on the surface of the cushion pad body 231 on the seat back surface side by using a proper joint material such as a double-sided adhesive tape or an adhesive.

In the cushion pad 220 of this example, similarly to the cushion pad 20 illustrated in FIG. 3, it is possible to reduce the number of members and man-hours required for fixing the air cell 30, and to reduce a cost required for producing the seat. In addition, it is possible to effectively reflect the change of the air cell 30 in the shape and the like by expansion and contraction, and the resultant change in the use feeling in the seat front surface.

In the cushion pad 220 of this example, the air cell 30 is disposed on the surface of the cushion pad body 231 on the seat back surface side, and the change of the air cell 30 in the shape and the like by expansion and contraction is indirectly reflected in the seat front surface through the cushion pad body 231. The cushion pad 120 illustrated in FIG. 6, that is, the cushion pad 120 in which the air cell 30 is provided on the surface of the cushion pad body 131 on the seat front surface side is useful in a case where the change in the use feeling is excessive, and the like. The change of the air cell 30 in the shape and the like by expansion and contraction, and the resultant change in the use feeling can be alleviated to a proper degree by the cushion pad body 231, and be reflected in the seat front surface. Such an effect can also be applied to the cushion pad 20 illustrated in FIG. 3, that is, the cushion pad 20 in which the air cell 30 is buried in the cushion pad body 31.

The configuration of the above-described seat and cushion pad is merely an example, and hence, the present invention may be properly modified or changed without departing from the spirit and scope of the invention.

For example, while the air cell 30 is provided in the lumber part 13 of the seat back 3 in the above description, the air cell 30 can be provided also in the cushion part 10, the thigh support part 11, or the side support part 12 of the seat cushion 2, or the middle-folded part 14 or the side support part 15 of the seat back 3. The present invention can be applied to any one of them.

As described above, the seat cushion pad disclosed in this specification includes the cushion pad body, and the air cell which can be expanded and contracted by the supplied/exhausted air. The air cell is provided integrally with the cushion pad body, and is held by the cushion pad body.

In the seat cushion pad disclosed in this specification, the air cell is provided on the surface of the cushion pad body on the seat front surface side.

In the seat cushion pad disclosed in this specification, the air cell is provided on the surface of the cushion pad body on the seat back surface side.

In the seat cushion pad disclosed in this specification, the air cell is provided in the inner portion of the cushion pad body.

In the seat cushion pad disclosed in this specification, the cushion pad body is formed of a resin foam material, and is foam-molded integrally with the air cell.

In the seat cushion pad disclosed in this specification, the air cell is stuck on the surface of the cushion pad body.

In the seat cushion pad disclosed in this specification, the slit extending into the cushion pad body is provided in the cushion pad body, and the air cell is inserted into the slit.

The seat disclosed in this specification includes the above-described seat cushion pad, and the seat cushion pad is fixed in the seat frame so that the air cell also is fixed in the seat frame.

INDUSTRIAL APPLICABILITY

The present invention is not limited to a seat mounted in a vehicle such as an automobile, and can be applied to another seat such as an office chair.

The present application is based on Japanese Patent Application (No. 2014-225268) filed on Nov. 5, 2014. The contents thereof are incorporated hereinto by reference.

DESCRIPTION OF REFERENCE NUMERALS AND SIGNS

1: seat
2: seat cushion
3: seat back
20: cushion pad
21: seat frame
30: air cell
31: cushion pad body
36: slit

The invention claimed is:

1. A seat cushion pad comprising:
a cushion pad body;
a reinforcement material attached to a surface of the cushion pad body on a seat back surface side opposite to a seat front surface, the seat front surface, in operation, contacts an occupant;
an air cell configured to be expanded and contracted by supplied/exhausted air, wherein
the air cell is provided in direct contact with the cushion pad body and is held by the cushion pad body, and the air cell is provided in an inner portion of the cushion pad body; and
a slab harder than the cushion pad body provided between the air cell and the reinforcement material, the slab supporting a peripheral portion of the air cell from the seat back surface side, the slab is in direct contact with the reinforcement material and the air cell, and the reinforcement material, the slab, and the air cell are arranged in order from the seat back surface side to the seat front surface.

2. The seat cushion pad according to claim 1, wherein the air cell is provided on a surface of the cushion pad body on a seat front surface side corresponding to the seat front surface.

3. The seat cushion pad according to claim 2, wherein the air cell is stuck on the surface of the cushion pad body on the seat front surface side.

4. The seat cushion pad according to claim 2, wherein the cushion pad body is formed of a resin foam material and is foam-molded integrally with the air cell.

5. The seat cushion pad according to claim 1, wherein the air cell is provided on a surface of the cushion pad body on the seat back surface side.

6. The seat cushion pad according to claim 5, wherein the cushion pad body is formed of a resin foam material and is foam-molded integrally with the air cell.

7. The seat cushion pad according to claim 5, wherein the air cell is stuck on the surface of the cushion pad body on the seat back surface side.

8. The seat cushion pad according to claim 1, wherein the cushion pad body is formed of a resin foam material and is foam-molded integrally with the air cell.

9. The seat cushion pad according to claim 1, wherein: a slit extending into the cushion pad body is provided in the cushion pad body; and the air cell is inserted into the slit.

10. A seat comprising:
a seat cushion pad including: a cushion pad body and an air cell configured to be expanded and contracted by supplied/exhausted air; and a seat frame, wherein:
- the air cell is provided in direct contact with the cushion pad body and is held by the cushion pad body and is provided in an inner portion of the cushion pad body, and,
- the seat cushion pad is fixed to the seat frame so that the air cell is also fixed to the seat frame;
- a reinforcement material is attached to a surface of the cushion pad body on a seat back surface side opposite to a seat front surface, the seat front surface, in operation, contacts an occupant; and
- a slab harder than the cushion pad body is provided between the air cell and the reinforcement material, the slab supporting a peripheral portion of the air cell from the seat back surface side, the slab is in direct contact with the reinforcement material and the air cell, and the reinforcement material, the slab, and the air cell are arranged in order from the seat back surface side to the seat front surface.

* * * * *